United States Patent
Pearce et al.

(10) Patent No.: US 11,114,263 B2
(45) Date of Patent: Sep. 7, 2021

(54) MAGNETIC ELECTRICAL SWITCH

(71) Applicant: Eaton Intelligent Power Limited, Dublin (IE)

(72) Inventors: Michael Pearce, Plum Branch, SC (US); Travis Spoone, Greenwood, SC (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 16/685,304

(22) Filed: Nov. 15, 2019

(65) Prior Publication Data
US 2020/0194201 A1 Jun. 18, 2020

Related U.S. Application Data

(60) Provisional application No. 62/781,025, filed on Dec. 18, 2018.

(51) Int. Cl.
*H01H 36/00* (2006.01)
*H02B 13/00* (2006.01)

(52) U.S. Cl.
CPC ......... *H01H 36/0073* (2013.01); *H02B 13/00* (2013.01); *H01H 2221/044* (2013.01); *H01H 2225/008* (2013.01); *H01H 2225/014* (2013.01)

(58) Field of Classification Search
None
See application file for complete search history.

(56) References Cited

U.S. PATENT DOCUMENTS

| | | | |
|---|---|---|---|
| 2,264,746 A | 12/1941 | Ellwood | |
| 2,384,988 A | 9/1945 | Ellis et al. | |
| 5,646,587 A * | 7/1997 | Miyazawa | H03K 17/97 335/205 |
| 6,950,033 B1 * | 9/2005 | Guyre | E05B 17/10 340/542 |
| 7,310,221 B2 | 12/2007 | Lammers | |
| 9,336,963 B1 | 5/2016 | Pearce | |
| 9,754,738 B2 | 9/2017 | Faulkner et al. | |
| 9,859,691 B2 | 1/2018 | Faulkner et al. | |
| 2003/0217574 A1 * | 11/2003 | Meis | E05B 47/0615 70/257 |

(Continued)

OTHER PUBLICATIONS

VisoVac fault interrupter, Network Protector Catalog Data, Publication No. CA024002EN, Eaton, Effective Aug. 2015 (16 pages total).

(Continued)

*Primary Examiner* — Courtney L Smith
(74) *Attorney, Agent, or Firm* — DiBerardino McGovern IP Group LLC

(57) ABSTRACT

A magnetic electrical switch apparatus includes: a switch assembly that includes: a switch body housing including a stationary contact; a shaft configured to move relative to the switch body housing, the shaft including: a moveable contact; and a first magnet; and a movable support member including a second magnet. The moveable contact and the first magnet are configured to move with the shaft. Moving the movable support member moves the second magnet relative to the first magnet, and a magnetic interaction between the second magnet and the first magnet moves the moveable contact relative to the stationary contact to thereby change a state of the switch assembly.

20 Claims, 11 Drawing Sheets

(56) References Cited

U.S. PATENT DOCUMENTS

| | | | | |
|---|---|---|---|---|
| 2007/0018759 A1* | 1/2007 | Chiu | ................... | H05K 5/0017 |
| | | | | 335/78 |
| 2007/0024442 A1* | 2/2007 | Jolley | ................... | E05B 17/10 |
| | | | | 340/542 |
| 2012/0126918 A1* | 5/2012 | Hauzenberger | ........ | H01H 36/00 |
| | | | | 335/207 |
| 2013/0008873 A1* | 1/2013 | Siegenthaler | ............ | H01H 1/54 |
| | | | | 218/146 |
| 2017/0148596 A1* | 5/2017 | Ozaki | .................. | H01H 51/065 |
| 2018/0144890 A1* | 5/2018 | Boettcher | .............. | H01H 33/68 |

OTHER PUBLICATIONS

VisoVac Fault Interrupter, Network and Underground Distribution Solutions, Publication No. PA024003EN, Eaton, 2015 (4 pages total).

Reed switch, Wikipedia, available at en.wikipedia.org/wiki/Reed_switch, Wikimedia Foundation, Inc., edited Nov. 8, 2018 (4 pages total).

* cited by examiner

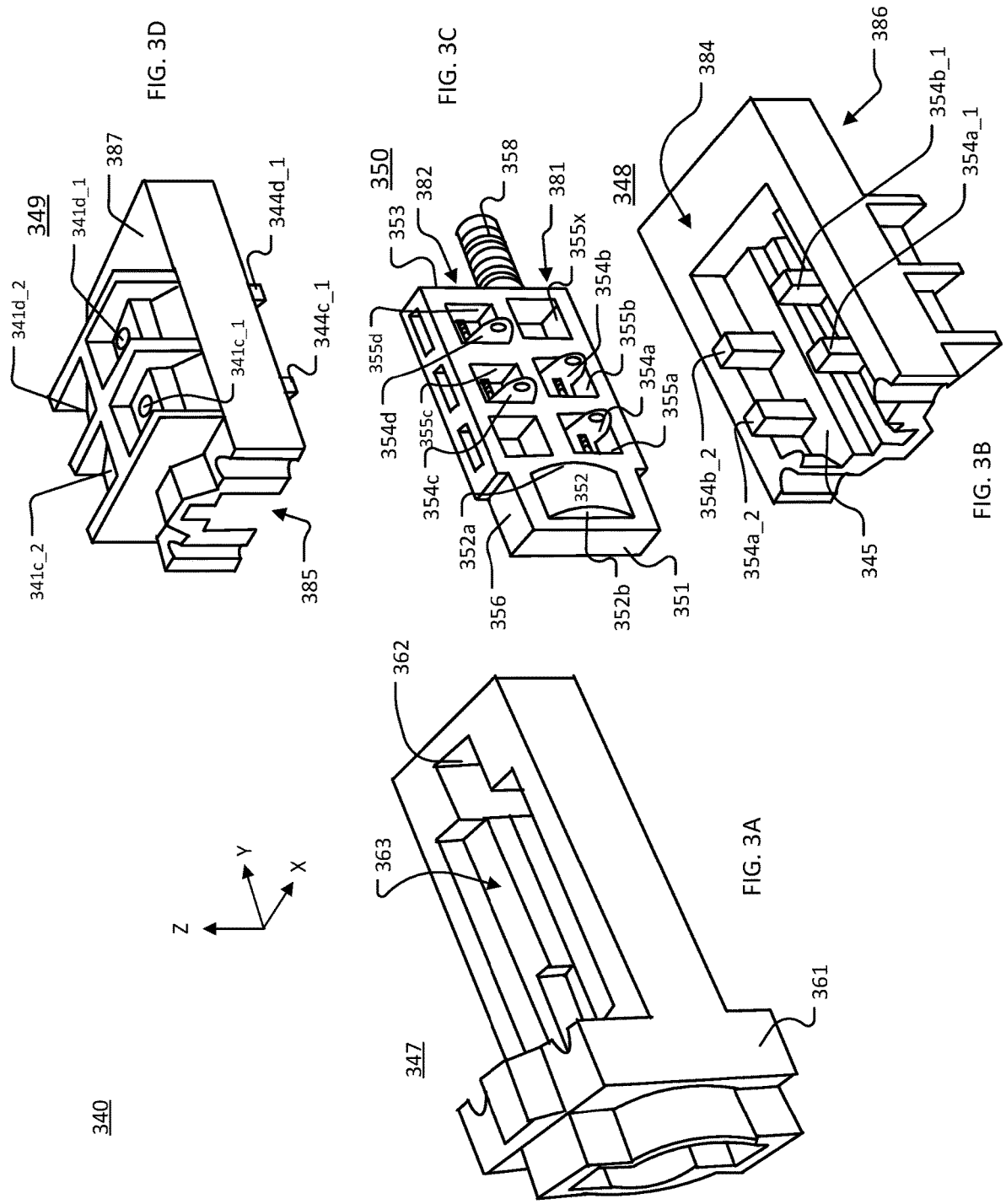

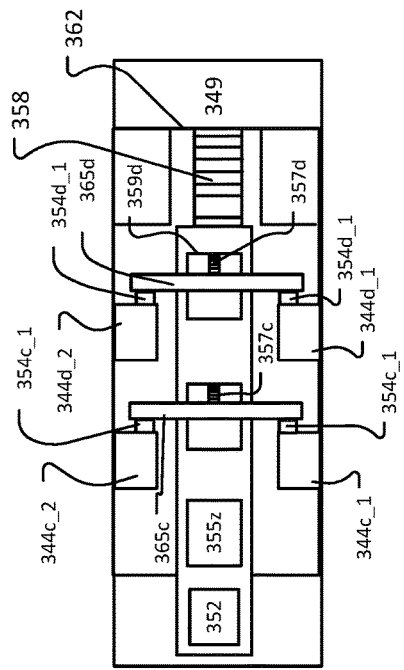
FIG. 3F_1
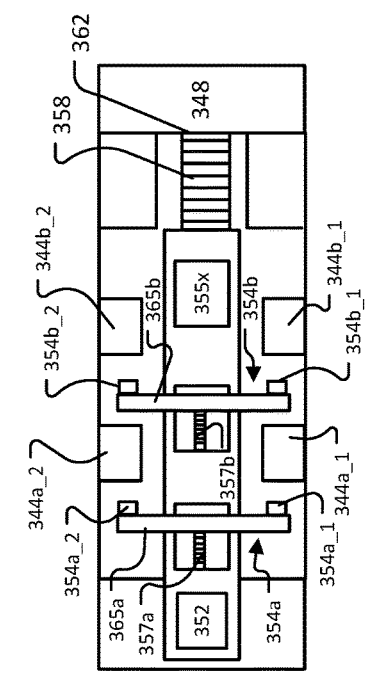
FIG. 3G_1
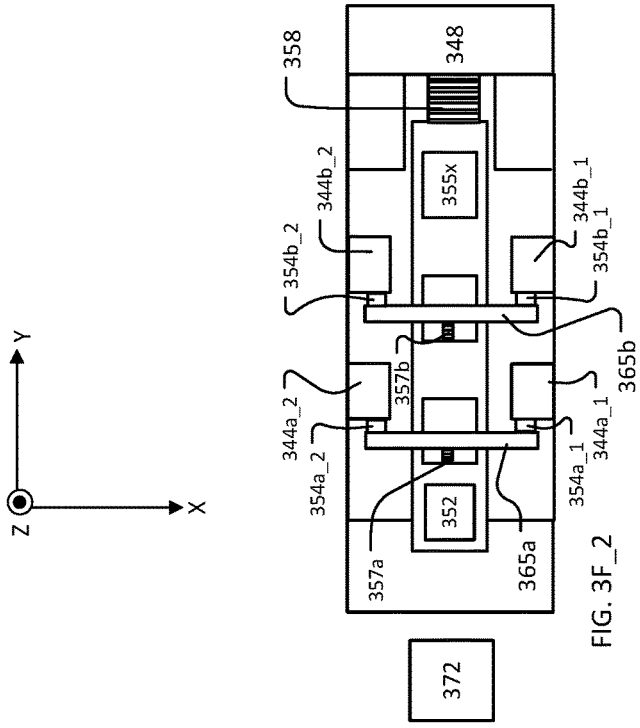
FIG. 3F_2
FIG. 3G_2

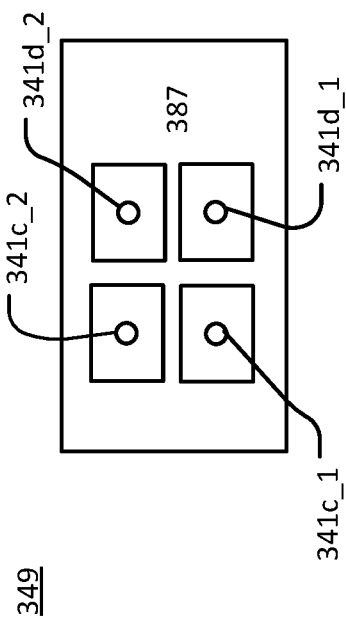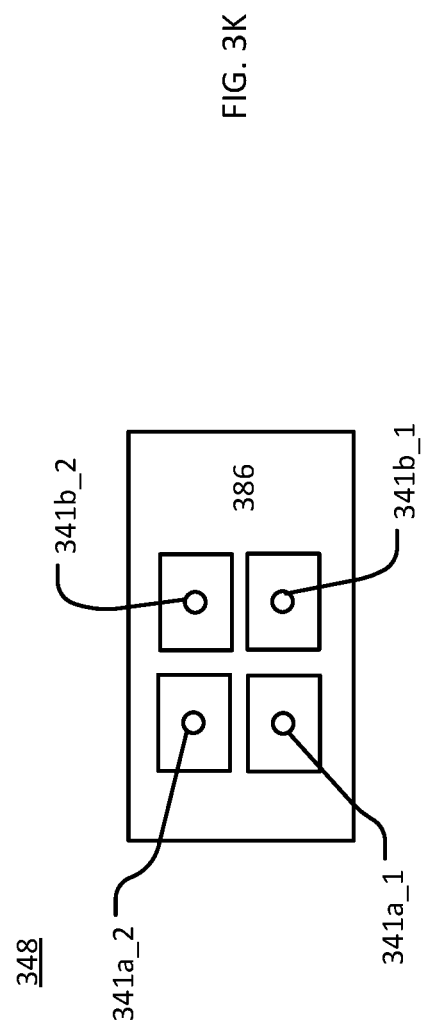

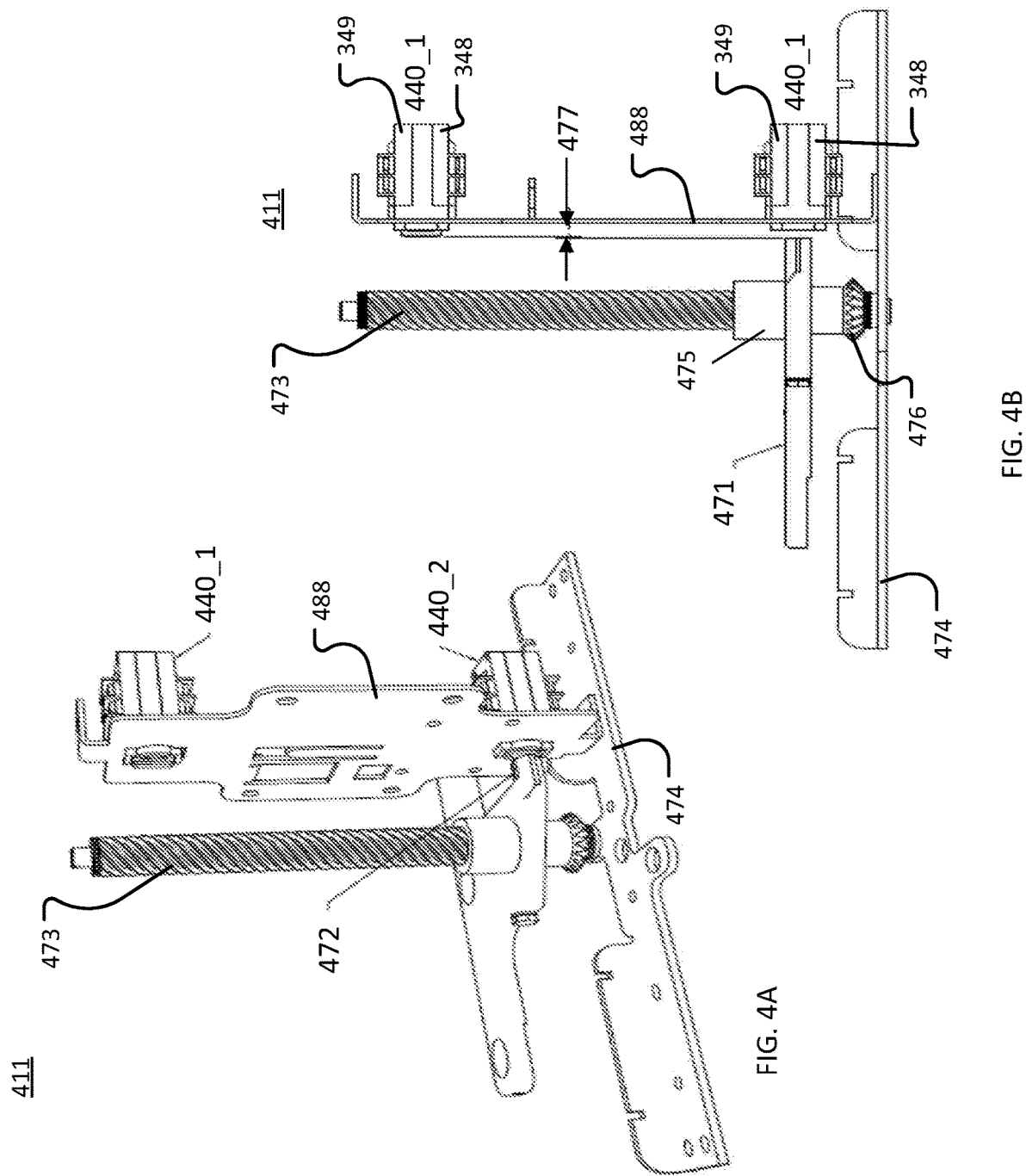

MAGNETIC ELECTRICAL SWITCH

CROSS-REFERENCE TO RELATED APPLICATION

This application claims the benefit of U.S. Provisional Application No. 62/781,025, filed on Dec. 18, 2018, and titled MAGNETIC ELECTRICAL SWITCH, which is incorporated herein by reference in its entirety.

TECHNICAL FIELD

This disclosure relates to a magnetic electrical switch. The magnetic electrical switch has a relatively high current carrying capacity (for example, 15 Amperes or greater) and may be used, for example, in an electro-mechanical assembly that is part of a high-voltage or medium-voltage electrical distribution system.

BACKGROUND

Disconnect systems are often used in electrical power distribution networks. The disconnect system is positioned between a power source and a load or loads that receive electricity from the power source. Under normal operating conditions, the disconnect system is closed, and electrical current flows through the disconnect system to the load or loads. Disconnect systems include switching and/or protective devices, such as switches, fuses, fault interrupters, and/or circuit breakers. In response to a detection of a fault condition and/or in response to manual action by an operator, the disconnect system opens to prevent current from flowing to the load or loads. A disconnect system may be padmounted, and a human operator may be able to open and close the disconnect system using a lever or shaft that is accessible from the exterior of the disconnect system.

SUMMARY

In one aspect, a magnetic electrical switch apparatus includes: a switch assembly that includes: a switch body housing including a stationary contact; a shaft configured to move relative to the switch body housing, the shaft including: a moveable contact; and a first magnet; and a movable support member including a second magnet. The moveable contact and the first magnet are configured to move with the shaft. Moving the movable support member moves the second magnet relative to the first magnet, and a magnetic interaction between the second magnet and the first magnet moves the moveable contact relative to the stationary contact to thereby change a state of the switch assembly.

Implementations may include one or more of the following features. The magnetic interaction may separate the moveable contact from the stationary contact or may join the moveable contact to the stationary contact to change the state of the switch assembly.

The first magnet may include a first north pole and a first south pole, the second magnet may include a second north pole and a second south pole, the shaft and the moveable member may be arranged such that, when the first magnet and the second magnet are in substantially the same plane, the first north pole faces the second north pole or the first south pole faces the second south pole, and the magnetic interaction may be a magnetic repulsion that moves the first magnet, the shaft, and the moveable contact away from the second magnet.

The movable support member and switch assembly may be physically separated and do not make direct physical contact with each other.

The switch assembly also may include an elastic member coupled to the shaft. The shaft may move away from the second magnet and compresses the elastic member in response to the magnetic interaction between the first magnet and the second magnet. The elastic member may include at least one spring.

The movable support member may be coupled to a linear actuator that is configured to move the movable support member in response to an activation input.

The switch body housing may include a plurality of stationary contacts, the shaft may include a plurality of moveable contact assemblies, and the magnetic interaction between the second magnet and the first magnet may move the shaft and all of the moveable contact assemblies relative to all of the stationary contacts to thereby change a state of the switch assembly.

The magnetic electrical switch apparatus also may include a fixed support member configured to hold the switching assembly in a fixed location. The fixed support member may be configured to hold a plurality of the switching assemblies. The magnetic interaction between the second magnet and the first magnet may move the shaft and the moveable contact relative to the stationary contact to thereby change a state of one of the plurality of switch assemblies.

The switching assembly may be configured to conduct an electrical current of 15 Amperes (A).

The moveable contact may be a movable contact assembly, and the stationary contact may be a pair of stationary contacts.

In another aspect, a disconnect system for a power distribution system includes: a first switch assembly includes: a first plurality of double break contact switches, each double break contact switch including a contact assembly and a plurality of stationary contacts; and a first moveable member that holds a first permanent magnet and the contact assemblies of the first plurality of double break contact switches; a second switch assembly including: a second plurality of double break contact switches, each double break contact switch including a contact assembly and a plurality of stationary contacts; and a second moveable member that holds a second permanent magnet and the contact assemblies of the second plurality of double break contact switches; and a third magnet configured to move relative to the first switch assembly and the second switch assembly. In operational use, the third magnet does not mechanically contact the first switch assembly or the second switch assembly, the first switch assembly is in an actuated state and the disconnect system is in a fully off status when the third magnet is aligned with the first permanent magnet, and the second switch assembly is in an actuated state and the disconnect system is in a service status when the third magnet is aligned with the second permanent magnet.

In some implementations, the first plurality of double break contact switches includes at least one normally open double break contact switch and at least one normally closed double break contact switch, and the second plurality of double break contact switches includes at least one normally open double break contact switch and at least one normally closed double break contact switch.

Implementations of any of the techniques described herein may include an apparatus, a device, a system, and/or a method. The details of one or more implementations are set forth in the accompanying drawings and the description

DRAWING DESCRIPTION

Figure 3E:
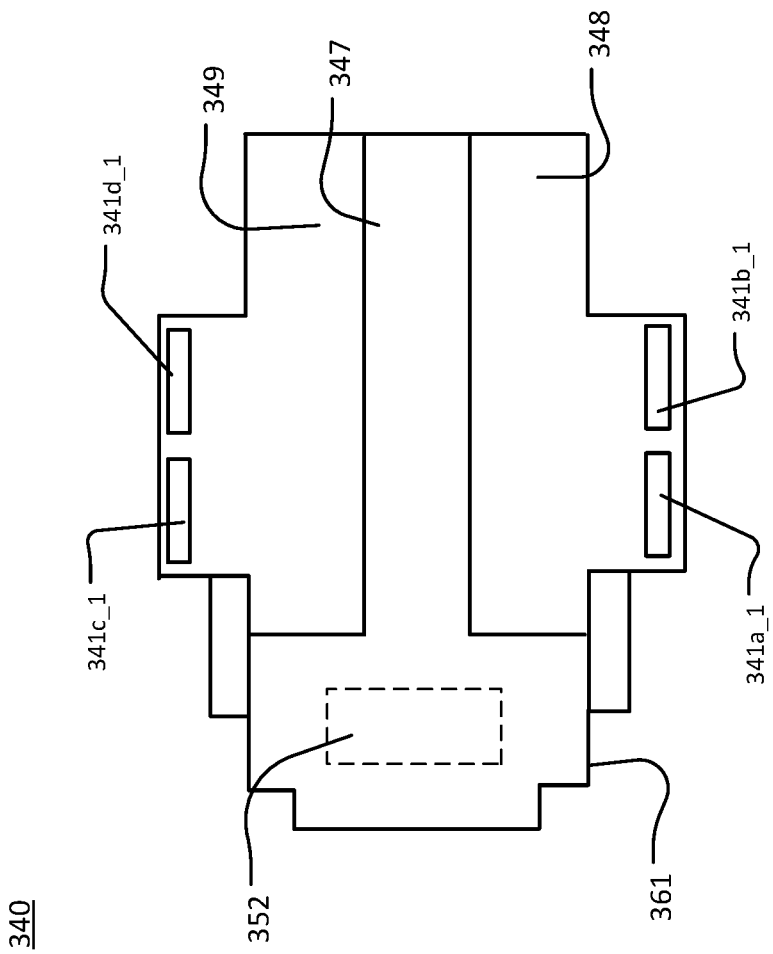
FIG. 3E is a side exterior view of an assembled switch assembly.

FIGS. 3F_1, 3F_2, 3G_1, and 3G_2 are top cross-sectional views of the switch assembly of FIG. 3E.

Figure 3H:
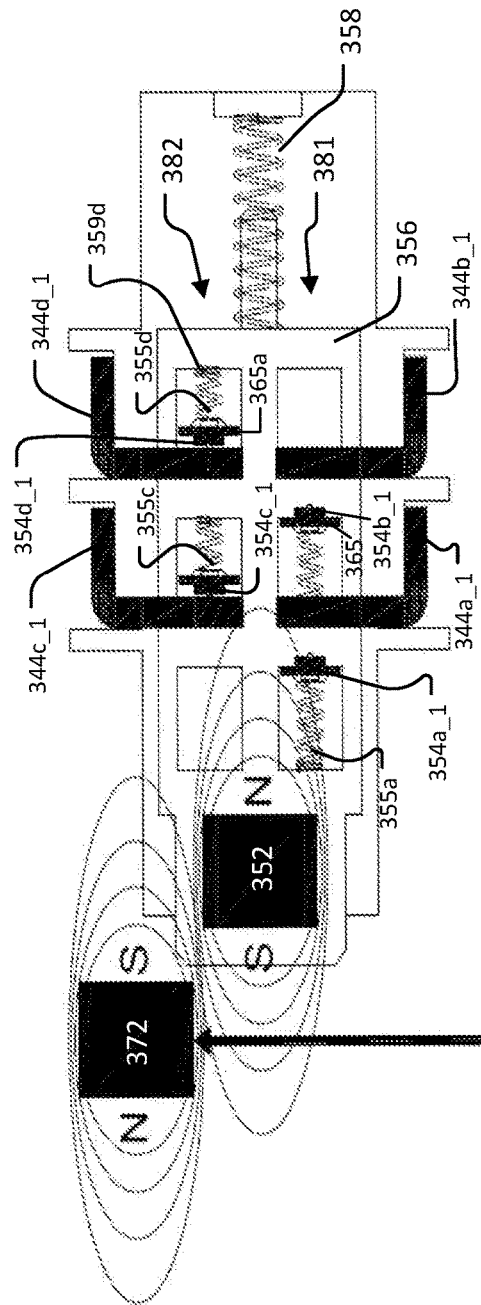
FIG. 3A is a perspective view of an example shaft housing.
FIG. 3B is a perspective view of an example first portion.
FIG. 3C is a perspective view of an example first magnet assembly.
FIG. 3D is a perspective view of an example second portion.
Figure 3I:
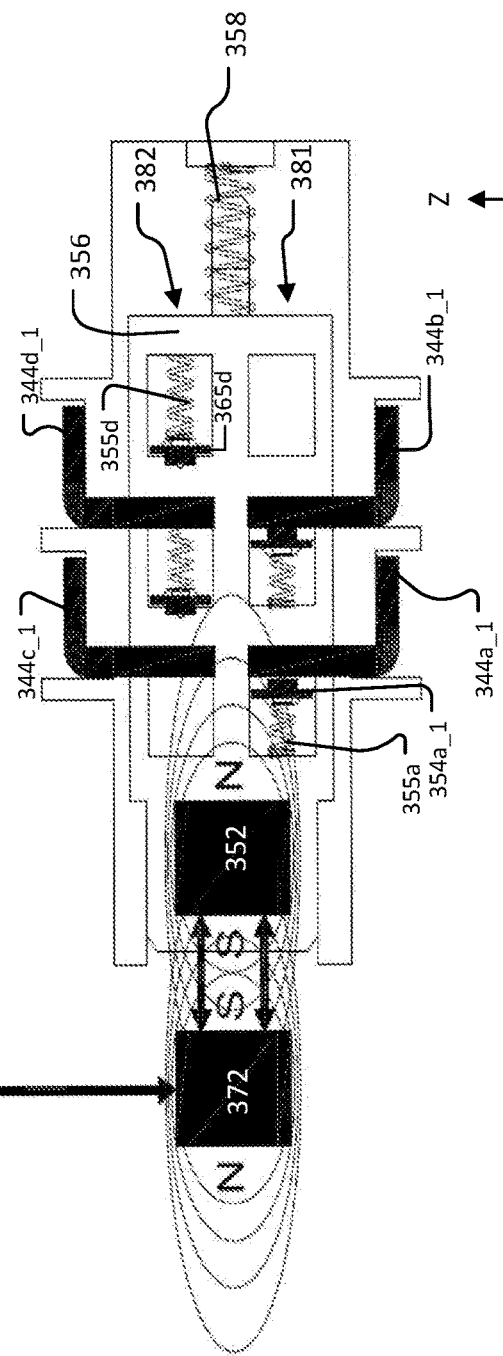

FIGS. 3H and 3I are side cross-sectional views of the switch assembly of FIG. 3E.

FIG. 3J shows an exterior view of the second portion of FIG. 3D.

FIG. 3K shows an exterior view of the first portion of FIG. 3B.

FIG. 4A is a perspective view of an example electromagnetic system.

FIG. 4B is a side view of the electromagnetic system of FIG. 4A.

Figure 5A:
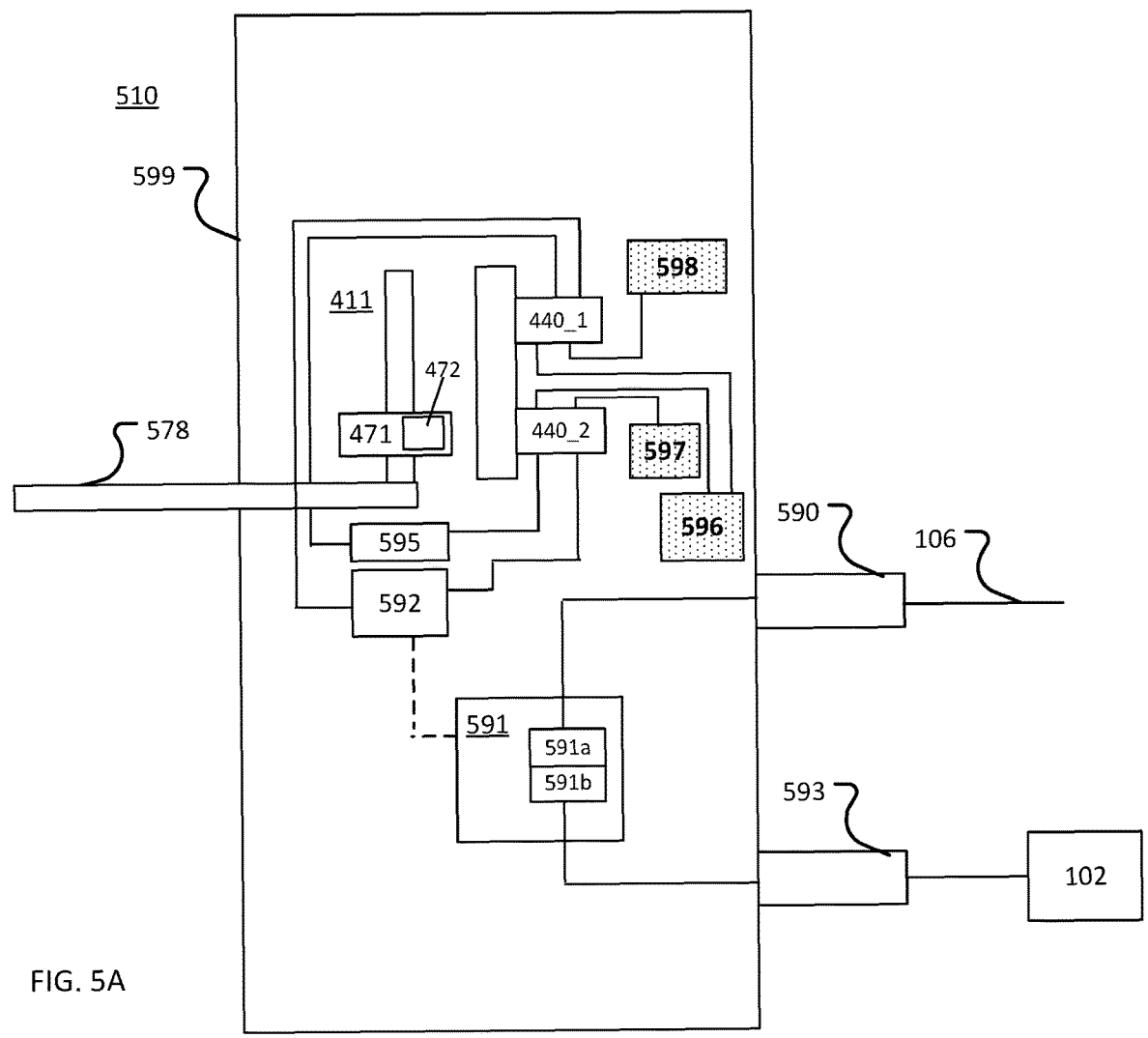
Figure 5B:
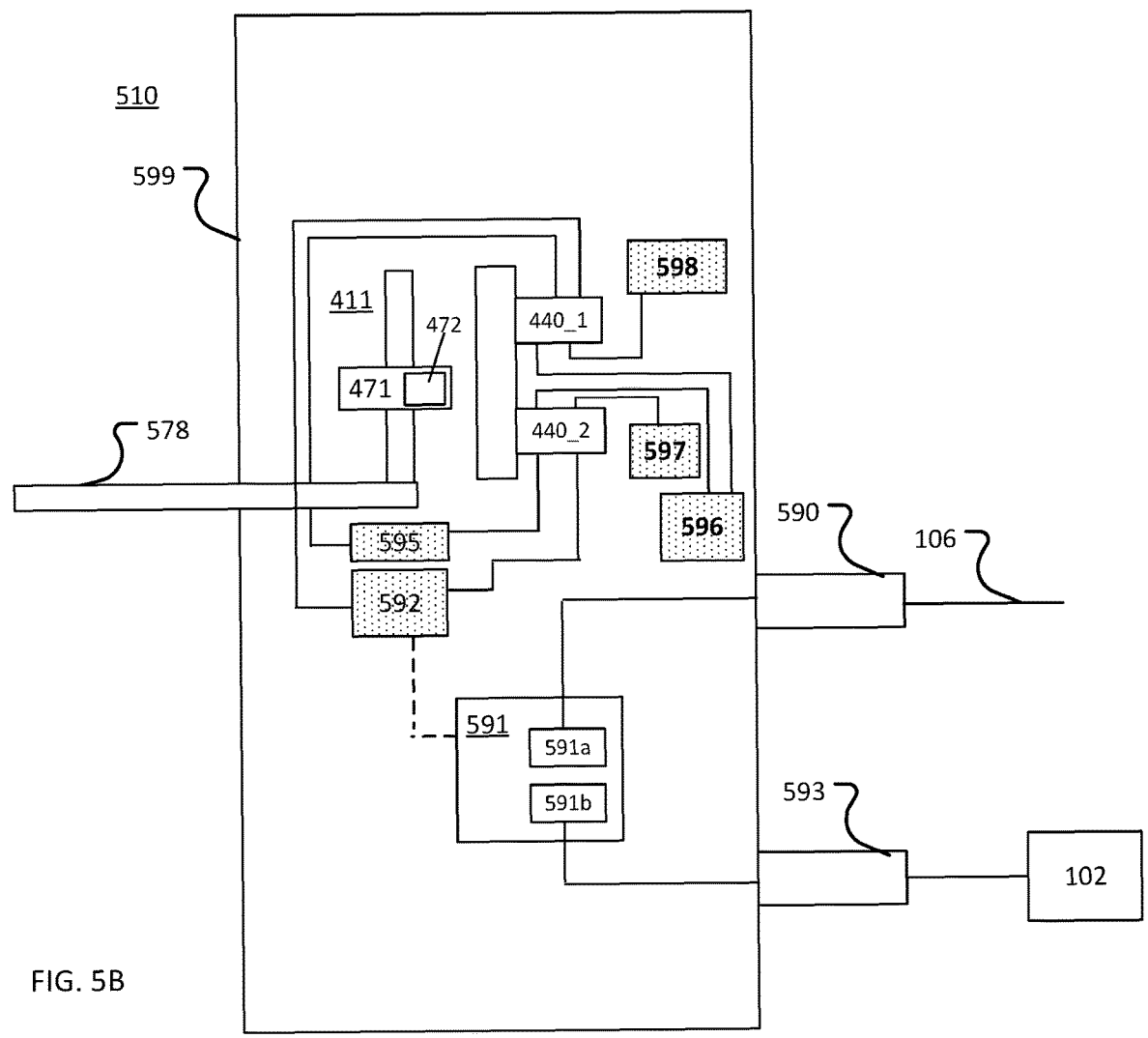
Figure 5C:
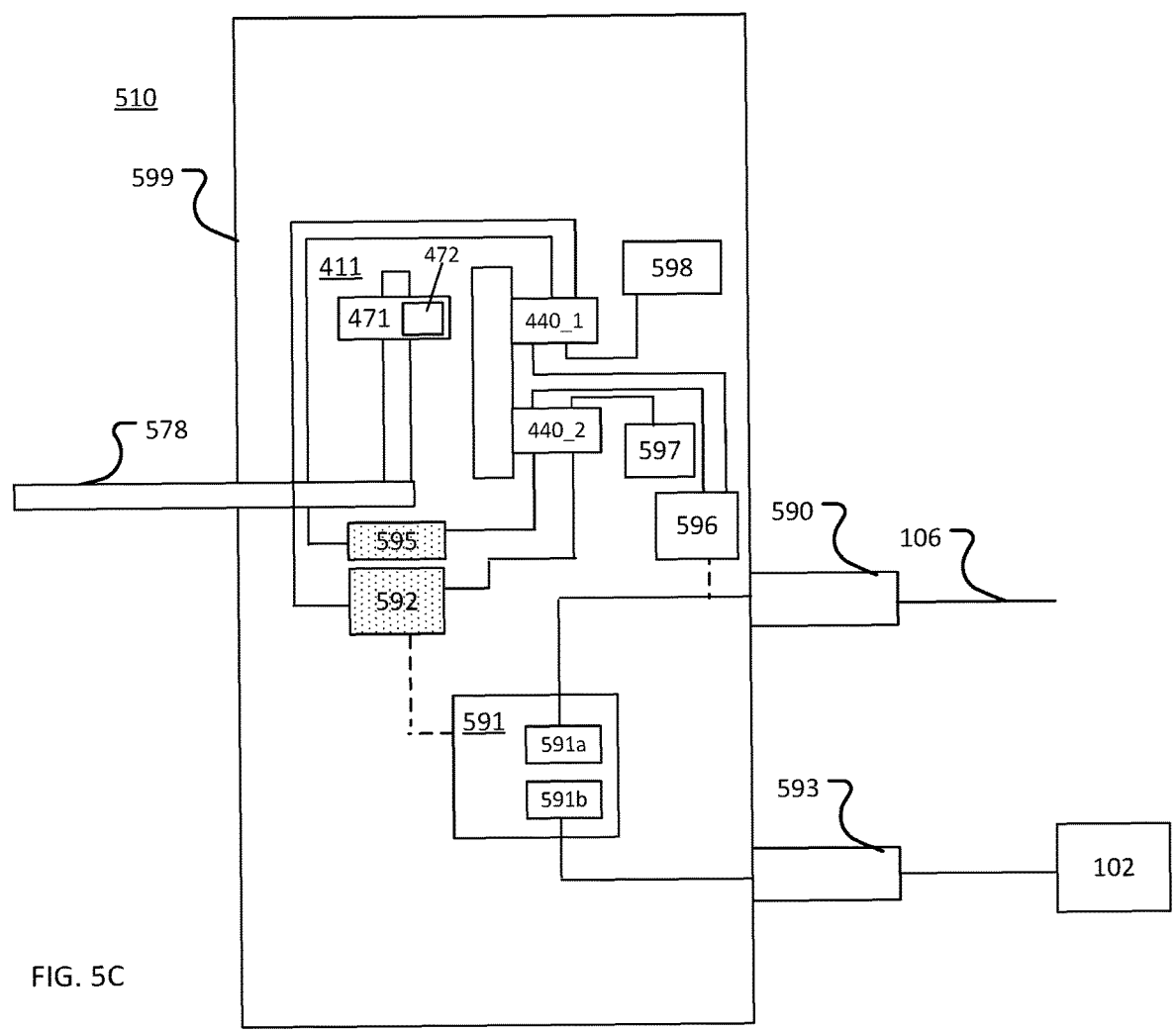

FIGS. 5A-5C are side block diagrams of an example of a disconnect system that includes the electromagnetic assembly of FIGS. 4A and 4B.

DETAILED DESCRIPTION

A switch apparatus is disclosed. The switch apparatus changes state based on a magnetic interaction and is capable of carrying and switching high currents (for example, 15 Amperes). The switch apparatus may be used in an electromechanical assembly, such as an electrical fault interrupter or other electrical disconnect system that enables a source of electrical power to be electrically isolated from a load. For example, the switch apparatus may be used in an electrical disconnect system that is between a network transformer and a load.

Figure 1:
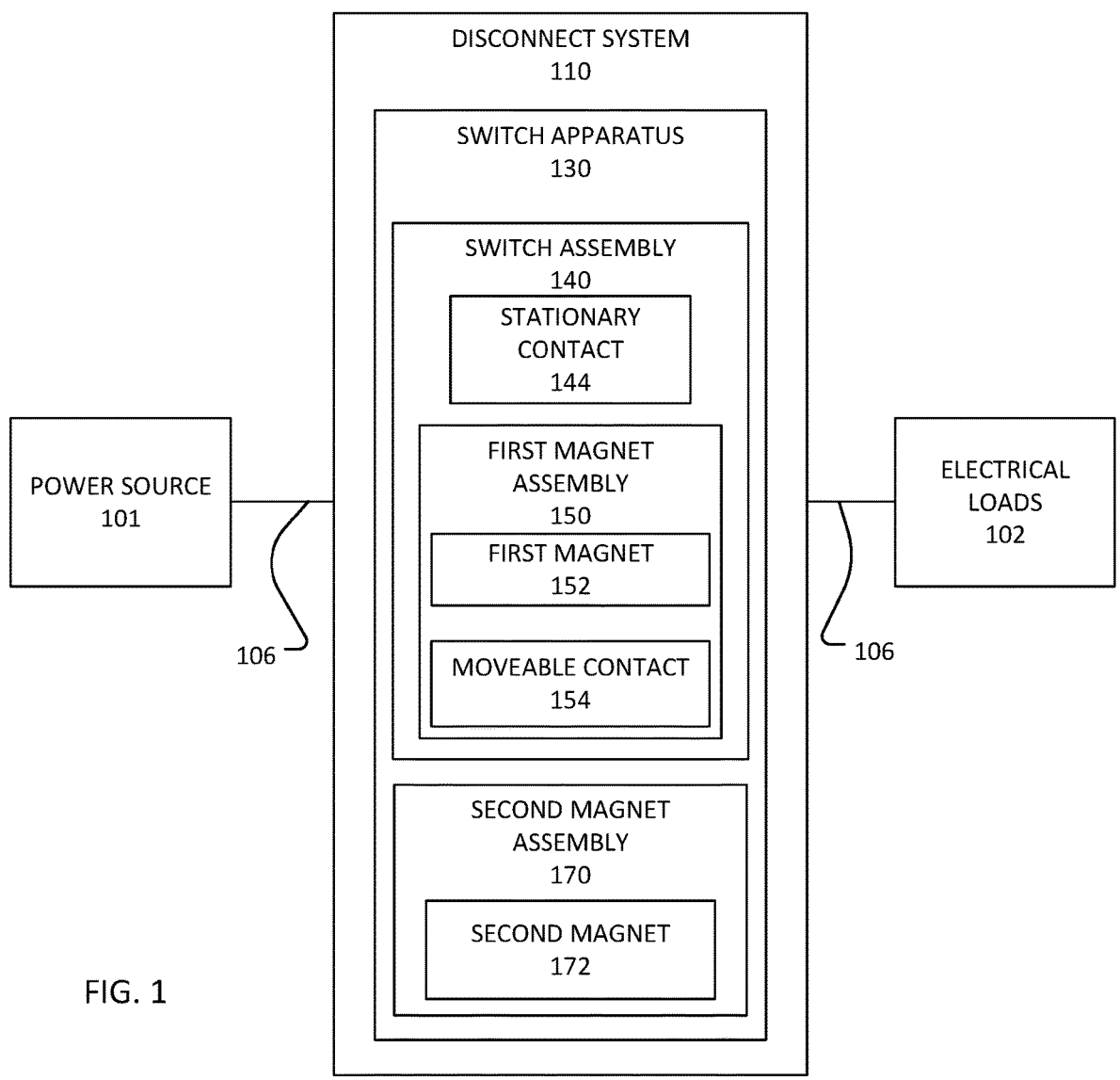
FIG. 1 is a block diagram of an example electrical power distribution network.

Referring to FIG. 1, a block diagram of an example electrical power distribution network 100 is shown. The electrical power distribution network 100 may be any network that transfers electricity from a power source 101 to an electrical load 102 via a distribution path 106. The distribution path 106 may include, for example, one or more transmission lines, electrical cables, wireless transmission paths, and/or any other mechanism for distributing electricity. The electrical power distribution network 100 may be, for example, an electrical grid, an electrical system, or a multi-phase electrical network that provides electricity to commercial and/or residential customers. The power distribution network 100 may have an operating voltage of, for example, at least 1 kilovolt (kV), up to 34.5 kV, up to 38 kV, up to 69 kV, or 69 kV or higher. The power distribution network 100 may operate at a fundamental frequency of, for example, 50-60 Hertz (Hz).

The network 100 includes a disconnect system 110 between the power source 101 and the electrical load 102. The disconnect system 110 is capable of connecting or disconnecting the power source 101 and the electrical load 102. For example, the disconnect system 110 may be a fault interrupter that disconnects the power source 101 from the load 102 under fault conditions.

The power source 101 may be any source of electrical power. For example, the power source 101 may be a power plant that produces electricity from renewable energy resources and/or fossil fuels, a substation, or electrical equipment that receives electricity from a power plant or substation, such as a network transformer or a switchgear. The load 102 may be any electrical equipment that receives electricity from the power source 101 and may include electrical equipment that receives and transfers or distributes electricity to other equipment in the power distribution network 100. For example, the electrical equipment 102 may include transformers, fuses, electrical machinery in a manufacturing facility, and/or electrical appliances and devices in a residential building.

The disconnect system 110 includes a switch assembly 140 that changes state based on a magnetic interaction and without making physical contact with moving components of the disconnect system 110. Conventional disconnect systems include switches (such as, for example, limit switches) that rely on mechanical interactions. For example, a positional indicator in a conventional disconnect system may rely on a moving arm or other moving component coming into direct physical contact with or directly touching a mechanical element. In a conventional disconnect system, an electrically conductive moving component may be used as part of an isolation switch that determines whether or not the source and the load are connected. The repeated mechanical interaction between the moving component and a stationary contact may lead to wear and/or deformation such that the performance of the disconnect assembly degrades. Furthermore, disconnect systems may be sealed and may be installed underground, in a remote location, and/or in a hazardous location. Thus, performing maintenance on a disconnect system (such as replacing a deformed moving component) may be challenging.

On the other hand, the disconnect system 110 employs a switch apparatus 130, which is a magnetic electrical switch. The switch apparatus 130 includes the switch assembly 140. The switch assembly 140 changes state based on a magnetic interaction and does not rely on a mechanical connection with a moving component of the disconnect system 110. The switch apparatus 130 may be more reliable and accurate and may have a longer usable life than conventional switches that rely on mechanical interactions. As a result, the disconnect system 110 (which includes the switch apparatus 130) offers more robust and reliable performance than a conventional disconnect system.

Furthermore, the switch apparatus 130 is able to conduct higher currents than known magnetic electrical switches. For example, the switch apparatus 130 is capable of conducting and switching high currents, such as currents of 15 Amperes (A). Thus, the switch apparatus 130 is suitable for use in scenarios in which the disconnect system 110 is part of a medium-voltage or high-voltage electrical power distribution network.

The switch apparatus 130 includes the switch assembly 140, which includes a stationary electrically conductive contact 144 and a first magnet assembly 150. The first magnet assembly 150 includes a first magnet 152 and a moveable contact 154. The stationary contact 144 may be a pair of stationary contacts, and the moveable contact 154 may be a pair of moveable contacts that are electrically connected by a conducting member such that the stationary contact 144, the conducting member, and the moveable contact 154 form a double break contact switch. FIGS. 3A-3K show an implementation of the switch assembly 140 that includes a plurality of double break contact switches.

The second magnet assembly 170 includes a second magnet 172. The state of the switch assembly 140 is changed based on a magnetic interaction between the second magnet 172 and the first magnet 152. The first magnet 152 is a permanent magnet. A permanent magnet is a magnet made from a magnetized material that creates a persistent magnetic field. The first magnet 152 may be made of, for example, iron, nickel, and/or cobalt, and/or a rare-earth element, such as, for example, neodymium, yttrium, or samarium-cobalt. Using a permanent magnet as the first magnet 152 allows the switch apparatus 130 to be simpler than a design that includes an electromagnet (that is, a magnet that is only magnetized when an electrical current flows in the material). Moreover, using a rare earth magnet allows the magnet 152 to generate a relatively strong magnetic field relative to the size of the magnet. The first magnet 152 and the second magnet 172 may be made of the same magnetic material or may be made of different magnetic materials. For example, in some implementations, the second magnet 172 is an electro-magnet.

Figure 2A:
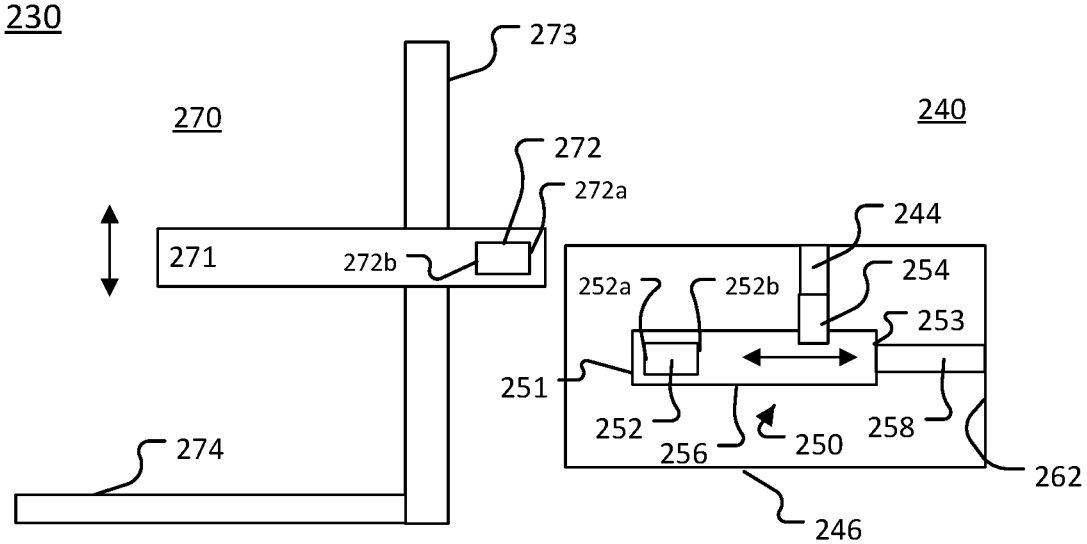
FIG. 2A and FIG. 2B are side block diagrams of an example switch apparatus.
Figure 2B:
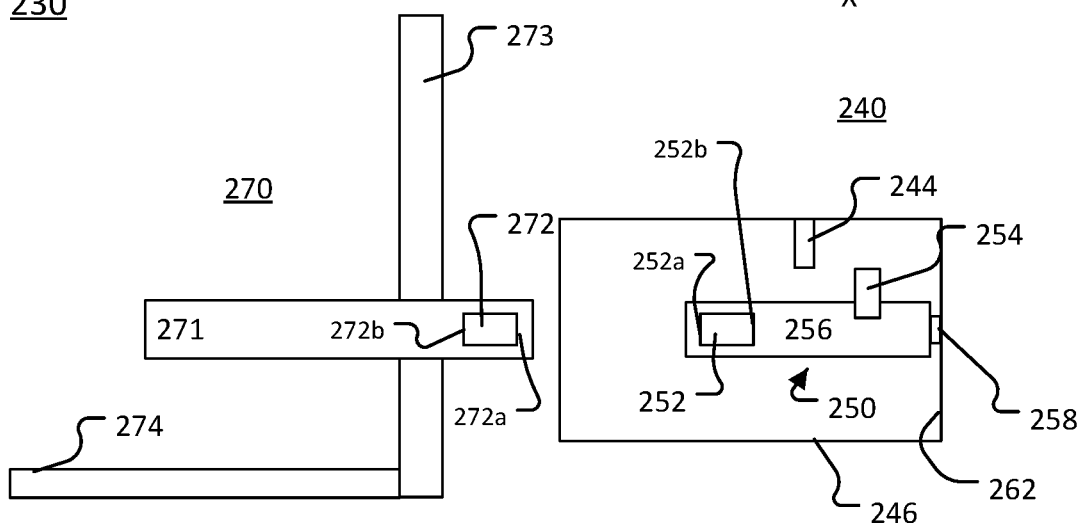

FIG. 2A and FIG. 2B show, respectively, a side block diagram of a switch apparatus 230 in a first state (a static state) and a side block diagram of the switch apparatus 230 in a second state (an actuated state). The switch apparatus 230 is an example implementation of the switch apparatus 130 (FIG. 1), and the switch apparatus 230 may be used in the power distribution network 100 (FIG. 1).

The switch apparatus 230 includes a switch assembly 240 and a second magnet assembly 270. The second magnetic assembly 270 includes a movable support 271. The moveable support 271 may be a moving component of an electromagnetic apparatus, such as the disconnect system 110 of FIG. 1. The switch assembly 240 and the second magnet assembly 270 do not directly touch each other, and the state of the switch assembly 240 is changed without any component of the second magnetic assembly 270 touching any components of the switch assembly 240. In other words, there is no mechanical interaction or direct physical contact between any component of the switch assembly 240 and the second magnetic assembly 270.

Instead, a magnetic interaction between a first magnet 252 of the switch assembly 240 and a second magnet 272 of the movable support 271 changes the state of the switch assembly 240. The magnetic interaction occurs when the first magnet 252 and the second magnet 272 are close enough to each other to exert a force on each other. However, the first magnet 252 and the second magnet 272 do not have to touch or make direct physical contact with each other to produce the magnetic interaction.

The second magnet 272 and the first magnet 252 have respective north poles 272a, 252a and south poles 272b, 252b. The north poles 252a, 272a and south poles 252b, 272b are at opposite ends of the respective magnets 252, 272. The like poles repel each other, and the opposite poles attract each other. In the example of FIGS. 2A and 2B, when the first magnet 252 and the second magnet 272 are in the same X-Y plane, the north pole 272a faces the north pole 252a. In other implementations, the first magnet 252 and the second magnet 272 are arranged such that the south pole 252b faces the south pole 272b when the first magnet 352 and the second magnet 272 are in the same X-Y plane. In the example discussed below, the magnetic interaction is a repulsive force generated when the north pole 252a faces the north pole 272a.

The switch assembly 240 includes a stationary contact 244 mounted to a switch mount 246. The switch mount 246 remains in a fixed location during use. For example, in implementations in which the switch apparatus 230 is used in the disconnect system 110, the switch mount 246 is mounted to a wall or fixed support within a housing of the disconnect system 110. The stationary contact 244 is attached to the switch mount 246. For example, the stationary contact 244 may be riveted, brazed, molded, or welded to the switch mount 246 or securely screwed to the switch mount 246. The stationary contact 244 is made from an electrically conductive material, such brass, copper, or another metal.

The switch assembly 240 also includes a first magnet assembly 250. The first magnet assembly 250 includes a first magnet 252 and a moveable conductive contact 254. The first magnet 252 and the moveable contact 254 are mounted to and move with a moveable member 256. The moveable member 256 extends along the Y direction from an end 251 to an end 253. In the example of FIGS. 2A and 2B, the first magnet 252 is mounted near the end 251.

The stationary contact 244 may be a pair of stationary contacts 244, and the moveable contact 254 may be a pair of moveable contacts attached by a conducting member (not shown) that extends along the X axis. In these implementations, the pair of stationary contacts 244, the pair of moveable contacts 254, and the conducting member form a double break contact switch. FIGS. 3A-3K show an implementation of the switch assembly 240 that includes a plurality of double break contact switches.

The switch mount 246 is a housing, bracket, or any other structure capable of supporting the stationary contact 244 and holding the moveable member 256. The moveable member 256 is any structure that is capable of holding the first magnet 252 and the moveable contact 254 and that is also capable of moving relative to the switch mount 246. For example, the moveable member 256 may be a rod or other three-dimensional structure that slides along the Y axis on a track in the switch mount 246 or a rod that is within a recess of the switch mount 246 and slides along the Y axis within the recess.

The first magnetic assembly 250 also includes an elastic member 258 coupled to the end 253 of the movable member 256 and to the switch mount 246. The elastic member 258 extends along the Y axis and the center of the elastic member 258 may coincide with the center of the movable member 256 in the X-Z plane. The elastic member 258 is any structure that compresses and expands relative to a neutral or resting position. For example, the elastic member 258 may be a spring or a collection of springs. When the elastic member 258 is in the neutral or resting position, the switch assembly 240 is in the static state. The elastic member 258 is not expanded or contracted in the static state and exerts no force on the movable member 256. FIG. 2A shows the elastic member 258 in the neutral or resting position.

The moveable member 256 is in a first position (FIG. 2A) in the switch mount 246 when the switch assembly 240 is in the static state and a second position (FIG. 2B) in the switch mount 246 when the switch assembly 240 is in the actuated state. The movable member 256 only moves relative to the switch mount 346 when the switch assembly 240 is changing states. In other words, the switch assembly 240 has two stable states. The moveable member 256 is stationary in the first position when the switch assembly 240 is in the static state, and the moveable member 256 is stationary in the second position when the switch assembly 240 is in the actuated state.

The switch apparatus 230 also includes the second magnet assembly 270. The second magnet assembly 270 includes the movable support 271 and the second magnet 272, which is mounted to the moveable support 271. The movable support 271 is coupled to a post 273 and an actuation mechanism 274. Interacting with the actuation mechanism 274 causes the moveable support 271 to move along the post 273 in the Z or −Z direction. The actuation mechanism 274 is any mechanism capable of causing the moveable support 271 to move along the post 273. For example, the actuation mechanism 274 may be a rotatable shaft that is connected to a gear assembly (such as the gear mechanism 476 of FIGS. 4A and 4B) that moves the moveable support 271 along the post 273. In another example, the actuation mechanism is a lever connected to the moveable support 271.

FIG. 2A shows the switch assembly 240 in the static state. The switch assembly 240 is configured to be a normally closed switch. Thus, in the static state, the stationary contact 244 and the moveable contact 254 are in direct physical contact and electric current can flow between the stationary contact 244 and the moveable contact 254. To change the state of the switch assembly 240, the actuation mechanism 274 is used to move the support 271 in the −Z direction until the second magnet 272 and the first magnet 252 are in substantially the same X-Y plane. As the second magnet 272 gets closer to the first magnet 252, a side magnetic resistance arises and the first magnet 252 and the second magnet 272 pull toward each other. The actuation mechanism 274 is used to continue moving the second magnet 272 in the −Z direction until the north pole 272a of the second magnet 272 faces the north pole 252a of the first magnet 252 (FIG. 2B).

When the like poles of the first magnet 252 and the second magnet 272 face each other, the first magnet 252 and the second magnet 272 exert a repulsive force on each other. The support 271 remains in the same position on the post 273 such that the north pole 272a of the second magnet 272 is held facing the north pole 252a of the first magnet 252. The second magnet 272 is fixed to the moveable support 271 and only moves when the moveable support 271 moves. The second magnet 272 does not move in response to the repulsive force. However, the first magnet 252, which is mounted on the moveable member 256, does move in response to the repulsive force. The repulsive force pushes the first magnet 252 away from the second magnet 272 along the Y direction. The first magnet 252 is mounted to the moveable member 256, and the moveable contact 244 is also mounted to the moveable member 256. Thus, the repulsive force causes the movable member 256 to move from the first position (FIG. 2A) to the second position (FIG. 2B).

When the moveable member 256 moves, the moveable contact 254 also moves along the Y direction (away from the second magnet 272) and separates from the stationary contact 244, thereby changing the state of the switch assembly 240 from the static state (FIG. 2A) to the actuated state (FIG. 2B). The repulsive force on the first magnet 252 also pushes the moveable member 256 against the elastic member 258 in the Y direction, thereby compressing the elastic member 258 between the end 253 of the movable member 256 and a wall 262 of the switch mount 246. The repulsive force between the first magnet 252 and the second magnet 272 is sufficiently strong to keep the elastic member 258 compressed. As such, the stationary contact 244 and the moveable contact 254 remain separated until the repulsive force between the first magnet 252 and the second magnet 272 is no longer present.

To remove the repulsive force, the actuation mechanism 274 is used to move the movable support 271 and the second magnet 272 along the Z axis (in the −Z direction or the Z direction). When the first magnet 252 and the second magnet 272 are not in the same X-Y plane (for example, the north poles 272a and 252a are separated along the Z axis), the north pole 252a of the first magnet 252 and the north pole 272a of the second magnet 272 no longer face each other and the repulsive force is not generated. The stored potential energy in the compressed elastic member 258 is released, and the elastic member 258 pushes the moveable member 256 in the −Y direction from the second position (FIG. 2B) to the first position (FIG. 2A). The stationary contact 244 and the moveable contact 254 separate, and the switch assembly 240 is returned to the first state (FIG. 2A).

The above implementation uses a repulsive force generated by the north pole 272a facing the north pole 252a. However, in other implementations, the repulsive force may be generated by arranging the first magnet 252 and the second magnet 272 such that, when the magnets 252 and 272 are aligned as shown in FIG. 2B, the south pole 272b faces the south pole 252b. Moreover, in the implementation discussed above, the switch assembly 240 is normally closed (FIG. 2A). However, in other implementations, the switch assembly 240 is normally open. In these implementations, the stationary contact 244 and the moveable contact 254 are separated when the switch assembly 240 is in the static state.

Referring to FIGS. 3A-3D, an exploded perspective view of an example of a switch assembly 340 is shown. The switch assembly 340 is an example of an implementation of the switch assembly 140 (FIG. 1), and the switch assembly 340 may be used in the disconnect system 110 (FIG. 1). The switch assembly 340 includes a plurality of double break contact switches arranged in two rows, as discussed further below.

FIG. 3A is a perspective view of a shaft housing 347. FIG. 3B is a perspective view of a first portion 348. FIG. 3C is a perspective view of a first magnet assembly 350. FIG. 3D is a perspective view of a second portion 349. The first portion 348 and the second portion 349 are identical. FIGS. 3E-3K also show various aspects of the switch assembly 340. FIG. 3E is a side exterior view of the switch assembly 340 as assembled (with a first magnet 352 shown in dashed lines to indicate that the magnet 352 is not visible from the exterior). FIGS. 3F_1 and 3F_2 are top cross-sectional views of the first portion 348 and a first row 381 of the movable member 356 in the X-Y plane. FIGS. 3G_1 and 3G_2 are top cross-sectional views of the second portion 349 and a second row 382 of the moveable member 356 in the X-Y plane. FIGS. 3H and 3I are side cross-sectional views of the switch assembly 340 in the Y-Z plane. FIGS. 3F_1, 3G_1, and 3H show the switch assembly 340 in the static state. FIGS. 3F_2, 3G_2, and 3I show the switch assembly 340 in the actuated state. FIG. 3J shows an exterior view of the second portion 349. FIG. 3K shows an exterior view of the first portion 348.

Referring to FIGS. 3A-3E, the shaft housing 347 includes a mounting bracket 361 and a recessed region 363. When the switch assembly 340 is assembled, the first magnet assembly 350 is in the recessed region 363 and the shaft housing 347 is captured between an interior side 384 of the first portion 348 and an interior side 385 of the second portion 349. Together, the first portion 348 and the second portion 349 form a switch mount housing. The first magnet assembly 350 is able to move in the recessed region 363 and is thus able to move relative to and within the assembled switch mount housing.

The first magnet assembly 350 includes a movable member 356 and a spring 358 that is attached to an end 353 of the moveable member 356. The moveable member 356 is a three-dimensional body to which a first magnet 352 is mounted. The first magnet 352 is close to an end 351, which is on a side of the moveable member 356 opposite to the end 353. The first magnet 352 is a permanent magnet and may be made of a magnetized rare earth material. The first magnet 352 is affixed to the movable member 356 and moves with the moveable member 356. The first magnet 352 has a north pole 352a and a south pole 352b at an end opposite to the north pole 352a. The first magnet 352 is arranged such that the south pole 352b is closer to the end 351 and the north pole 352a is closer to the end 353.

The moveable member 356 also includes contact slots 355a, 355b, 355c, 355d, 355x, and 355z. The contact slots are recesses or openings in the body of the moveable member 356. The contact slots are arranged in a rectilinear grid. The contact slots 355a, 355b, and 355x are spaced from each other along the Y direction in a row 381. The contact slots 355z, 355c, and 355d are spaced from each other along the Y direction in a row 382. The row 382 is separated from the row 381 in the Z direction. The contact slots may be used to mount moveable electrical contact assemblies (discussed below) or the contact slots may be empty. In the example of FIG. 3C, the contact slots 355a-355d are used to mount moveable electrical contact assemblies 354a-354d. The contact slots 355x and 355z are empty. The empty contact slot 355z is above the contact slot 355a, and the empty contact slot 355x is below the contact slot 355d. Thus, the electrical contact assembles 354a and 354b in the row 382 are staggered or displaced along the Y direction relative to the contact assemblies 354 c and 354d in the row 381. This arrangement allows the switch assembly 340 to have two normally open contacts and two normally closed contacts, as discussed below.

Referring also to FIGS. 3F_1, 3F_2, 3G_1, and 3G_2, each moveable contact assembly 354a-354d includes a respective first electrical contact 354a_1-354d_1 and a respective second electrical contact 354a_2-354d_2 that are electrically connected by a respective conductive bridge 365a-365d. Each conductive bridge 365a-365d is attached to a respective contact spring 357a-357d that is connected to a wall of the respective contact slot 355a-355d. Although each contact slot has a wall, for simplicity, only the wall 359d of the contact slot 355d is labeled. Each moveable contact assembly 354a-354d is affixed to the movable member 356 by the respective contact spring 357a-357d. Thus, the electrical contact assemblies 354a-354d move with the moveable member 356 and are moveable electrical contacts.

The first portion 348 includes two pairs of stationary electrical contacts. The first pair of stationary electrical contacts includes contacts 344a_1 and 344a_2. The second pair of stationary electrical contacts includes contacts 344b_1 and 344b_2. The contacts 344a_1, 344a_2, 344b_1, and 344b_2 extend upward from an interior surface 345 of the first portion 348. The electrical contacts 344a_1, 344a_2, 344b_1, and 344b_2 are affixed to the first portion 348 and do not move relative to the switch mount housing during operational use.

The second portion 349 also includes two pairs of stationary electrical contacts arranged in the same way. Two of the four stationary electrical contacts of the second portion 349 are shown in FIG. 3B and are labeled as contacts 344c_1 and 344d_1. The first portion 348 also includes the contacts 344c_2 and 344d_2, which are shown in FIGS. 3G_1 and 3G_2.

The stationary contacts (344a_1, 344a_2, 344b_1, 344b_2, 344c_1, 344c_2, 344d_1, 344d_2) and the movable contact assemblies (354a-354d) are made from an electrically conductive material, such as metal, and are configured to carry relatively high electrical currents (for example, 15 A). The stationary contacts and movable contact assemblies may be made of, for example, a metallic material such as, for example, brass, copper, and/or a metal alloy.

The operation of the switch assembly 340 is discussed with respect to FIGS. 3F_1, 3F_2, 3G_1, 3G_2, 3H, and 3I. FIGS. 3F_1 and 3F_2 are top cross-sectional views that show the interaction between the stationary contacts of the first portion 348 and the movable contact assemblies 354a and 354b, which are in the first row 381 of the movable member 356. FIG. 3F_1 shows the switch assembly 340 in the static state, and the FIG. 3F_2 shows the switch assembly 340 in the actuated state. FIGS. 3G_1 and 3G_2 are top cross-sectional views of that show the interaction between the stationary contacts of the second portion 349 with the movable contact assemblies 354c and 354d, which are in the second row 382 of the movable member 356. FIG. 3G_1 shows the switch assembly 340 in the static state and FIG. 3G_2 shows the switch assembly 340 in the actuated state.

FIGS. 3H and 3I are side-cross sectional views of the assembled switch assembly 340. FIG. 3H shows the switch assembly 340 in the static state and FIG. 3I shows the switch assembly 340 in the actuated state. In the example of FIGS. 3H and 3I, the first moveable contacts 354a_1-354d_1, the conducting bridges 356a-365d, and the stationary contacts 344a_1-344d_1 are shown.

The switch assembly 340 includes two double break contact switches that are normally open and two double break contact switches that are normally closed. Referring also to FIG. 3F_1, the stationary contacts 344a_1, 344a_2 and the moveable contact assembly 354a form one of the normally open double break contact switches. The stationary contacts 344b_1, 344b_2 and the moveable contact assembly 354b form the other normally open double break contact switch. Referring to FIG. 3G_1, the stationary contacts 344c_1, 344c_2 and the movable contact assembly 354c form one of the normally closed double break contacts switches. The stationary contacts 344d_1, 344d_2 and the moveable contact assembly 354d form the other normally closed double break contact switch.

When the switch assembly 340 is in the static state (FIGS. 3F_1, 3G_1, and 3H), the spring 358 is in the relaxed or neutral position. As shown in FIG. 3H, a second magnet 372 is displaced in the −Z direction relative to the first magnet 352. Because the second magnet 372 is displayed in the −Z direction relative to the first magnet 352 when the switch assembly 340 is in the static state, the second magnet 372 is not shown in FIGS. 3F_1 and 3G_1.

The distance and relative orientation of the first and second magnets 352, 372 in FIG. 3H is such that the magnets 352 and 372 do not apply a force to each other. With the first and second magnets 352, 372 in this configuration, the contacts 354a_1, 354a_2 of the moveable contact assembly 354b and the contacts 354b_1, 354b_2 of the moveable contact assembly 354b are not connected to any stationary contacts. Thus, current is unable to flow between the stationary contact 344a_1 and the stationary contact 344a_2 or between the stationary contact 344b_1 and the stationary contact 344b_2.

The contacts 354c_1, 354c_2 of the contact assembly 354c are connected to the contacts 344c_1 and 344c_2. The contacts 354d_1, 354d_2 of the assembly 354d are connected to the contacts 344d_1 and 344d_2. Thus, electrical current may flow from the stationary contact 344c_1 into the contact 354c_1, the conducting bridge 365c, the contact 354c_2 and into the stationary contact 344c_2. Similarly, electrical current may flow from the stationary contact 344d_1 to the stationary contact 344d_2.

The positioning of the contact assembly 354c relative to the stationary contacts 344c_1 and 344c_2 causes the contact spring 357c to be compressed when the spring 358 is in the relaxed or neutral position. Similarly, the contact spring 357d is compressed between the conductive member 365d and a wall 359d of the contact slot 355d when the spring 358 is in the relaxed position. The compressed contact springs 357c, 357d apply force to the conductive bridges 365 and 365d, respectively, in the −Y direction to thereby secure the contact 354c_1, 354c_2 to the respective stationary contact 344c_1, 344c_2 and to secure the contact 354d_1, 354d_2 to the respective stationary contact 344d_1, 344d_2. The compressed contact springs 357c, 357d provide force sufficient to hold the contacts 354c_1, 354c_2, 354d_1, and 354d to the respective stationary contacts even when high currents (for example, 15 A) flows in the closed double break contact switch. Thus, the compressed contact springs 357c, 357d help to ensure that the normally closed double break contact switches are actually closed when the switch assembly is in the static state. The contact springs 357a and 357b (which are associated with the two normally open double break contact switches) are in the resting or neutral position when the switch assembly 340 is in the static state.

To change the state of the switch assembly 340, the second magnet 372 is moved in the −Z direction until the south pole 372b of the second magnet 372 faces the south pole 352b of the first magnet 352 and the magnets 352 and 372 are close enough to produce a magnetic interaction (a repulsive force in this example). FIG. 3I shows the magnets 372 and 352 oriented such that the magnets 372 and 352 exert a repulsive force on each other. The magnet 372 is held in a fixed location. The repulsive force pushes the first magnet 352 in the Y direction, causing the moveable member 356 to move in the Y direction and compressing the spring 358. The contact assembly 354c separates from the stationary contacts 344c_1 and 344c_2, and the contact assembly 354d separates from the stationary contacts 344d_1 and 344d_2. The contact 354a_1, 354a_2 makes with, respectively, the stationary contact 344a_1, 344a_2. The contact 354b_1, 354b_2 makes with, respectively, the stationary contact 344a_2, 344b_2. Thus, the two normally open double break contact switches close and the normally closed double break contact switches open, and the switch assembly 340 state is changed to the actuated state. The spring 358 remains compressed and the switch assembly 340 remains in the actuated state until the repulsive force is removed.

Referring to FIGS. 3D, 3J, and 3K, the first portion 348 and the second portion 349 also include wiring terminals. Each wiring terminal is electrically connected to one of the stationary contacts. Thus, in the example of the switch assembly 340, each of the first portion 348 and the second portion 349 include four wiring terminals.

FIG. 3D shows the four wiring terminals 341c_1, 341c_2, 341d_1, 341d_2 on a side 387 of the second portion 349. The side 387 is opposite the interior side 385. Thus, the wiring terminals 341c_1, 341c_2, 341d_1, 341d_2 are on the exterior of the second portion 349 and are accessible from the exterior of the assembled switch assembly 340. The first portion 348 has four wiring terminals arranged in the same manner.

FIG. 3J shows the exterior side 387 of the second portion 349. The wiring terminals 341c_1, 341c_2, 341d_1, 341d_2 are arranged in a grid at the exterior side 387. The wiring terminal 341c_1 is electrically connected to the stationary contact 344c_1, the wiring terminal 341c_2 is electrically connected to the stationary contact 344c_2, the wiring terminal 341d_1 is electrically connected to the stationary contact 344d_1, and the wiring terminal 341d_2 is electrically connected to the stationary contact 344d_2.

Each wiring terminal 341c_1, 341c_2, 341d_1, 341d_2 may be connected via a lead or cable to a device that is external to the switch assembly 340 (such as the indicator 597 of FIGS. 5A-5C). The operation of the external device is controlled by the state of the switch assembly 340. For example, a visual indication mechanism (such as a light) may be connected in a circuit that is completed or opened by the double break contact switch formed by the stationary contacts 344c_1, 344c_2 and the movable contact assembly 354c. In this example, the wiring terminal 341c_1 may be connected to a power source and the 341c_2 may be connected to the visual indication mechanism. When the switch assembly 340 is in the static state, the visual indication mechanism receives electricity and produces a visual indicator that is perceivable by an operator and informs the operator that the switch assembly 340 is in the static state. When the switch assembly 340 is in the actuated state, the visual indication mechanism does not receive electricity.

The first portion 348 includes wiring terminals 341a_1, 341a_2, 341b_1, and 341b_2. FIG. 3K shows the exterior side 386 of the first portion 348. The wiring terminals 341a_1, 341a_2, 341b_1, and 341b_2 are at the exterior side 386 of the first portion 348 and are accessible from an exterior of the switch assembly 340. The wiring terminal 341a_1 is electrically connected to the stationary contact 344a_1. The wiring terminal 341a_2 is electrically connected to the stationary contact 344a_2. The wiring terminal 341b_1 electrically connected to the stationary contact 344b_1. The wiring terminal 341b_2 is electrically connected to the stationary contact 344b_2. Each wiring terminal 341a_1, 341a_2, 341b_1, and 341b_2 may be electrically connected to an external device via a lead or cable. The state of the external device is controlled by the state of the switch assembly 340.

Referring to FIGS. 4A and 4B, an example electromagnetic system 411 is shown. FIG. 4A is a perspective view of the electromagnetic system 411. FIG. 4B is a side view of the electromagnetic system 411. The electromagnetic system 411 may be used in the disconnect system 110 (FIG. 1).

The electromagnetic system 411 includes a mounting structure 488 that extends in the Z direction from a platform 474. Switch assemblies 440_1 and 440_2 are mounted to the mounting structure 488. Each switch assembly 440_1 and 440_2 is the same as the switch assembly 340 discussed with respect to FIGS. 3A-3K.

The switch assembly 440_1 and the switch assembly 440_2 are secured to the mounting structure 488 at respective mounting brackets 361 (FIG. 3A). The switch assembly 440_1 and the switch assembly 440_2 are mounted in separate regions of the mounting structure 488, with the switch assembly 440_1 being displaced in the Z direction relative to the switch assembly 440_2.

A threaded post 473 is also attached to the platform 474 and extends upward in the Z direction from the platform 474. The threaded post 473 is substantially parallel to the mounting structure 488. Although the threaded post 473 and the mounting structure 488 both extend from the platform, the threaded post 473 and the mounting structure 488 do not directly touch each other.

A movable platform 471 is mounted to the threaded post 473 with a holder 475. The movable platform 471 generally extends in the X-Y plane. The mounting structure 488 and the movable platform 471 are separated from each other in the Y direction by a gap 477. The gap 477 is a finite distance. Thus, the movable platform 471 does not touch or make a direct mechanical connection with the mounting structure 488 or the switches 440_1 and 440_2. Moreover, because the post 473 and the mounting structure 488 are substantially perpendicular, the gap 477 between the mounting structure 488 and the movable platform 471 is maintained even when the moveable platform 471 moves along the post 473.

A gear mechanism 476 is coupled to the movable platform 471. Turning the gear mechanism 476 causes the movable platform 471 to move along the post 473 in the −Z or Z direction. The moveable platform 471 does not rotate in the X-Y plane. The gear mechanism 476 may be turned with a shaft (such as the shaft 578 of FIGS. 5A-5C). In implementations in which the electromagnetic assembly 480 is enclosed in a housing (such as the housing 599 of FIGS. 5A-5C), the shaft extends through the housing such that an operator is able to move the movable platform 471 without opening the housing.

The movable platform 471 includes a magnet 472. The magnet 472 is a permanent magnet and may be a rare earth magnet. The magnet 472 is arranged on the movable platform 471 such that the same polarity of the magnet 472 and the magnet 352 (FIG. 3E) of the switch assemblies 440_1 and 440_2 face each other when the movable platform 471 is aligned with the switch assembly 440_1 or 440_2.

In the example of FIGS. 4A and 4B, the moveable platform 471 is aligned with the switch assembly 440_2. Thus, the switch assembly 440_2 is in the actuated state. The switch assembly 440_1 is in the static state. To change the state of the switch assemblies 440_1 and 440_2, the movable platform 471 is moved along the post 473 in the Z direction. As the movable platform 471 moves away from the switch assembly 440_2, the switch assembly 440_2 changes to the static state. While the movable platform 471 is between the switch 440_1 and the switch assembly 440_2, both the switch assembly 440_1 and 440_2 are in the static state. When the movable platform 471 causes the magnet 472 to align with the magnet 352 of the switch assembly 440_2, the switch assembly 440_2 changes to the actuated state and the switch assembly 440_1 remains in the static state.

FIGS. 5A-5C are side block diagrams of a disconnect system 510 that includes the electromagnetic assembly 480. The disconnect system 510 is enclosed in sealed a housing 599. The housing 599 is a three-dimensional body and may be made of any rugged material. The housing 599 may be fluid-tight. A shaft 578 extends through the housing 599 and connects to the gear mechanism 476 of the electromagnetic system 411.

The electromagnetic assembly 411 has two statuses: (1) a service status and (2) a fully off status. When the electromagnetic assembly 411 is in the service status, the disconnect system 510 delivers electricity to the load 102. When the electromagnetic assembly 480 is in the fully off status, the disconnect system 510 isolates the load 102. Additionally, when the electromagnetic assembly 411 is in the fully off status, the various electrical conductors in the disconnect system 510 are de-energized and it is safe to perform maintenance on the disconnect system 510. As such, reliably controlling the status of the disconnect system 510 and having access to reliable indicators of the status of the disconnect system 510 is important for the safe and robust operation and maintenance of the disconnect system 510.

The status of the electromagnetic system 411 is determined by the position of the movable platform 471 and the magnet 472. FIG. 5A shows the electromagnetic system 411 in the service status. FIG. 5C shows the electromagnetic system 411 in the fully off status. FIG. 5B shows the electromagnetic system 411 in transition from the service status to the fully off status.

The disconnect system 510 includes an isolation interlock 592, a ground interlock 596, and indicators 595, 597, and 598. The switch assemblies 440_1 and 440_2 are connected to these various elements as discussed below. In the discussion below, the rows 381 and 382 refer to the rows labeled in FIG. 3D.

The switch assembly 440_2 includes two double break contact switches arranged in the row 381 and two additional double break contact switches arranged in the row 382. One of the double break contact switches in the row 381 is connected to isolation interlock 592 and the other switch in the row 381 is connected to the indicator 595. One of the double break contact switches in the row 382 of the switch assembly 440_2 is connected to the ground interlock 596, and the other switch in the row 382 of the switch assembly 440_2 is connected to the indicator 597. As shown in, for example, FIGS. 3H and 3I, all of the double break contact switches that are in a particular row have the same state at any given time. Thus, the indicator 597 receives the same signal as the isolation interlock 592. As such, due to the configuration of the switch assembly 440_2, the indicator 597 is able to provide an accurate and reliable perceivable indication of the state of the switch assembly 440_2 and the status of the isolation interlock 592. The switch assembly 440_1 is identical to the switch assembly 440_2. The switch assembly 440_1 also includes two double break contact switches arranged in the row 381 and two additional double break contact switches arranged in the row 382. One of the double break contact switches in the row 381 is connected to the ground interlock 596. The other double break contact switch in the row 381 is connected to the indicator 598. One of the double break contact switches in the row 382 is connected to the isolation interlock 592. The other double break contact switch in the row 382 is connected to the indicator 595.

The ground interlock 596 grounds the source cable 590 when both of the double break contact switches connected to the ground interlock 596 are closed. This only occurs when the electromagnetic system 411 is in the fully off status. The isolation interlock 592 controls the operation of the circuit interrupter 591. The circuit interrupter 591 is only closed when both of the double break contact switches connected to the isolation interlock 592 are closed. This only occurs when the electromagnetic system 411 is in the service status.

The indicators 595, 597, and 598 may be visual indicators, such as lights, mounted in or on the housing 599. In other implementations, one or more of the indicators 595, 597, 598 are located outside of the housing 599. For example, the indicators 595, 597, 598 may be a device, such as a computer terminal, at a remote station that receives a signal from a SCADA transceiver (not shown) that provides data to the indicator when electricity flows through the closed double break contact switch.

Referring to FIG. 5A, in the service status, electricity flows in the distribution line 106 and into a high-voltage cable connector 590, through connected contacts 491a and 491b of a circuit breaking mechanism 591 (such as, for example, a vacuum interrupter), and to the load 102, which is connected to a second high-voltage cable connector 593. When the electromagnetic system 411 is in the service status, the switch assembly 440_2 is in the actuated state and the switch assembly 440_1 is in the static state. Thus, the double break contact switches in the row 381 of the switch assembly 440_2 are closed and the double break contact switches in the row 382 of the switch assembly 440_2 are open. The switch assembly 440_1 is in the static state. Thus, the double break contact switches in row 381 of the switch assembly 440_1 are open. The double break contact switches in row 382 of the switch assembly 440_1 are closed.

The isolation interlock 592 receives electricity from the switch assembly 440_1 and the switch assembly 440_2 and is in an on state. The isolation interlock 592 thus allows the contacts 591a and 591b of the circuit interrupter 591 to be closed or to remain closed (as shown in FIG. 5A). The indicator 595 is in an on state and provides a perceivable indication that the isolation interlock 592 is allowing the circuit breaking mechanism 591 to be closed. The elements that are shaded in FIG. 5A are elements that are in an off state. The ground interlock 596 does not receive electricity from both the switch assembly 440_1 and the switch assembly 440_1. Thus, the ground interlock 596 is in an off state and does not ground the source cable 590. The indicators 597 and 598 indicate that the source cable 590 is not grounded.

To change the disconnect assembly 511 to the fully off status, the circuit interrupting mechanism 591 is first opened, and then the shaft 578 is used to move the platform 471 toward the switch assembly 440_1. While the platform 471 is between the switch assembly 440_1 and 440_2 (as shown in FIG. 5B), both of the switch assemblies 440_1 and 441_2 are in the static state. The ground interlock 596 and the isolation interlock 592 are off. Thus, the contacts 591a and 592a of the circuit breaking mechanism 591 remain disconnected and the source cable 590 is not grounded. The indicators 595, 597, and 598 reflect this status.

FIG. 5C shows the disconnect assembly 511 in the fully off status. The switch assembly 440_1 is in the actuated state and the switch assembly 440_2 is in the static state. Thus, electricity flows from the switch assembly 440_1 and the switch assembly 440_2 to the ground interlock 596. The ground interlock 596 grounds the source cable 590. The indicators 597 and 598 are on and provide an indication that the grounding interlock 596 is grounding the source cable 590. The double break contact switches connected to the isolation interlock 592 are open. Thus, the isolation interlock 592 does not allow the circuit interrupting mechanism 591 to close. The indicator 595 provides a perceivable indication that the circuit interrupting mechanism 591 is open.

Other features are within the scope of the claims. For example, the moveable member 356 may include more contact slots such that more than two double break contact switches may be included in the switching assembly 340.

What is claimed is:

1. A magnetic electrical switch apparatus comprising:
a switch assembly comprising:
a switch body housing comprising a stationary contact;
a shaft configured to move relative to the switch body housing, the shaft comprising:
a moveable contact; and
a first magnet, wherein the moveable contact and the first magnet are configured to move with the shaft; and
a moveable support member comprising a second magnet, wherein
moving the moveable support member moves the second magnet relative to the first magnet, and a magnetic interaction between the second magnet and the first magnet moves the moveable contact relative to the stationary contact to thereby change a state of the switch assembly, and
the first magnet comprises a first north pole and a first south pole, the second magnet comprises a second north pole and a second south pole, the shaft and the moveable support member are arranged such that, when the first magnet and the second magnet are in substantially the same plane, the first north pole faces the second north pole or the first south pole faces the second south pole, and the magnetic interaction comprises a magnetic repulsion that moves the first magnet, the shaft, and the moveable contact away from the second magnet.

2. The apparatus of claim 1, wherein the magnetic interaction separates the moveable contact from the stationary contact or joins the moveable contact to the stationary contact to change the state of the switch assembly.

3. The apparatus of claim 1, wherein the moveable support member and switch assembly are physically separated and do not make direct physical contact with each other.

4. The apparatus of claim 1, wherein the switch assembly further comprises an elastic member coupled to the shaft.

5. The apparatus of claim 4, wherein the shaft moves away from the second magnet and compresses the elastic member in response to the magnetic interaction between the first magnet and the second magnet.

6. The apparatus of claim 5, wherein the elastic member comprises at least one spring.

7. The apparatus of claim 1, wherein the moveable support member is coupled to a linear actuator that is configured to move the moveable support member in response to an activation input.

8. The apparatus of claim 1, wherein the switch body housing comprises a plurality of stationary contacts, the shaft comprises a plurality of moveable contact assemblies, and the magnetic interaction between the second magnet and the first magnet moves the shaft and all of the moveable contact assemblies relative to all of the stationary contacts to thereby change a state of the switch assembly.

9. The apparatus of claim 1, further comprising a fixed support member configured to hold the switching assembly in a fixed location.

10. The apparatus of claim 9, wherein the fixed support member is configured to hold a plurality of the switching assemblies.

11. The apparatus of claim 10, wherein the magnetic interaction between the second magnet and the first magnet moves the shaft and the moveable contact relative to the stationary contact to thereby change a state of one of the plurality of switch assemblies.

12. The apparatus of claim 1, wherein the switching assembly is configured to conduct an electrical current of 15 Amperes (A).

13. The apparatus of claim 1, wherein the moveable contact comprises a moveable contact assembly, and the stationary contact comprises a pair of stationary contacts.

14. A magnetic electrical switch apparatus comprising:
a switch assembly comprising:
a switch body housing comprising a stationary contact;
a shaft configured to move relative to the switch body housing, the shaft comprising:
a moveable contact; and
a first magnet, wherein the moveable contact and the first magnet are configured to move with the shaft; and a moveable support member comprising a second magnet, wherein moving the moveable support member moves the second magnet relative to the first magnet, and a magnetic interaction between the second magnet and the first magnet moves the moveable contact relative to the stationary contact to thereby change a state of the switch assembly, and the moveable support member and switch assembly are physically separated and do not make direct physical contact with each other.

15. The apparatus of claim 14, wherein the magnetic interaction separates the moveable contact from the stationary contact or joins the moveable contact to the stationary contact to change the state of the switch assembly.

16. A magnetic electrical switch apparatus comprising:
a switch assembly comprising:
a switch body housing comprising a plurality of stationary contacts;
a shaft configured to move relative to the switch body housing, the shaft comprising:
a plurality of moveable contact assemblies; and
a first magnet, wherein the moveable contact assemblies and the first magnet are configured to move with the shaft; and
a moveable support member comprising a second magnet, wherein moving the moveable support member moves the second magnet relative to the first magnet, and a magnetic interaction between the second magnet and the first magnet moves the shaft and all of the moveable contact assemblies relative to all of the stationary contacts to thereby change a state of the switch assembly.

17. The apparatus of claim 16, wherein the switch assembly further comprises an elastic member coupled to the shaft.

18. The apparatus of claim 16, wherein the shaft further comprises:

a shaft housing that defines a recessed region; and
a moveable member, wherein
the moveable member is in the recessed region and is configured to move in the recessed region relative to the shaft housing, and
the first magnet and the plurality of moveable contact assemblies are mounted to the moveable member, and
the moveable contact assemblies and the first magnet being configured to move with the shaft comprises the moveable contact assemblies and the first magnet being configured to move with the moveable member.

19. The apparatus of claim 18, wherein the switch body housing further comprises:
a first portion; and
a second portion, wherein, the shaft housing is between an interior side of the first portion and an interior side of the second portion.

20. A magnetic electrical switch apparatus comprising:
a switch assembly comprising:
a switch body housing comprising a stationary contact;
a shaft configured to move relative to the switch body housing, the shaft comprising:
a moveable contact; and
a first magnet, wherein the moveable contact and the first magnet are configured to move with the shaft;
a moveable support member comprising a second magnet, wherein moving the moveable support member moves the second magnet relative to the first magnet, and a magnetic interaction between the second magnet and the first magnet moves the moveable contact relative to the stationary contact to thereby change a state of the switch assembly; and
a fixed support member configured to hold the switching assembly in a fixed location, wherein the fixed support member is configured to hold a plurality of the switching assemblies.

* * * * *